US012664319B2

(12) United States Patent
Jayasena et al.

(10) Patent No.: US 12,664,319 B2
(45) Date of Patent: Jun. 23, 2026

(54) DATA ENCRYPTION SUITABLE FOR USE IN SYSTEMS WITH PROCESSING-IN-MEMORY

(71) Applicant: Advanced Micro Devices, Inc., Santa Clara, CA (US)

(72) Inventors: Nuwan Jayasena, Cupertino, CA (US); Shaizeen Dilawarhusen Aga, Santa Clara, CA (US); Vignesh Adhinarayanan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 616 days.

(21) Appl. No.: 17/853,340

(22) Filed: Jun. 29, 2022

(65) Prior Publication Data

US 2024/0004801 A1 Jan. 4, 2024

(51) Int. Cl.
| *G06F 21/72* | (2013.01) |
| *G06F 9/30* | (2018.01) |
| *G06F 12/14* | (2006.01) |
| *G06F 21/79* | (2013.01) |

(52) U.S. Cl.
CPC .......... *G06F 21/72* (2013.01); *G06F 9/30029* (2013.01); *G06F 9/3004* (2013.01); *G06F 12/1408* (2013.01); *G06F 21/79* (2013.01)

(58) Field of Classification Search
CPC ... H04L 9/0618; G06F 12/14; G06F 12/1408; G06F 21/78–79; G06F 21/60; G06F 21/602; G06F 21/604
See application file for complete search history.

(56) References Cited

U.S. PATENT DOCUMENTS

| 6,295,606 | B1 | 9/2001 | Messerges et al. | |
| 8,467,526 | B2 | 6/2013 | Kunigk et al. | |
| 9,336,160 | B2 | 5/2016 | Hawkes et al. | |
| 2010/0115286 | A1* | 5/2010 | Hawkes | G06F 12/1408 |
| | | | | 713/189 |
| 2016/0171249 | A1* | 6/2016 | Circello | G06F 21/72 |
| | | | | 713/189 |
| 2017/0201503 | A1* | 7/2017 | Jayasena | H04L 63/0876 |
| 2017/0346622 | A1 | 11/2017 | Howard | |
| 2019/0043600 | A1* | 2/2019 | Saileshwar | G06F 21/79 |
| 2019/0114097 | A1* | 4/2019 | Tran | G11C 29/48 |
| 2022/0067157 | A1* | 3/2022 | Le Rolland | G06F 3/0659 |
| 2022/0199133 | A1* | 6/2022 | Tissafi Drissi | G11C 7/1006 |
| 2023/0266881 | A1* | 8/2023 | Peer | H04L 9/0894 |
| | | | | 711/105 |

OTHER PUBLICATIONS

Huang et al., A Wear Leveling Aware Counter Mode for Data Encryption in Non-Volatile Memories, 2017. (Year: 2017).*

(Continued)

*Primary Examiner* — Trong H Nguyen
(74) *Attorney, Agent, or Firm* — Polansky & Associates, P.L.L.C.; Paul J. Polansky

(57) ABSTRACT

An encryption circuit includes an iterative block cipher circuit. The iterative block cipher circuit has a counter input for a row index, a key input for receiving a secret key, and an output for providing an encrypted counter value in response to performing a block cipher process using the row index as a counter the secret key. The encryption circuit uses the iterative block cipher circuit during a row operation to a memory.

19 Claims, 6 Drawing Sheets

(56) References Cited

OTHER PUBLICATIONS

International Search Report and Written Opinion for International Application No. PCT/US2023/025442, mailed Oct. 4, 2023, 8 pages.
Mingxuan He et al.; "Newton: A DRAM-maker's Accelerator-in-Memory (AiM) Architecture for Machine Learning"; white paper; 2020 53rd Annual IEEE/ACM International Symposium on Microarchitecture (MICRO); Oct. 17-21, 2020; Athens, Greece; 14 pages.
Sukhan Lee et al.; "Hardware Architecture and Software Stack for PIM Based on Commercial DRAM Technology"; white paper; 2021 ACM/IEEE 48th Annual International Symposium on Computer Architecture (ISCA); Jun. 14-18, 2021; Valencia, Spain; 14 pages.
Young-Cheon Kwon et al.; "A 20nm 6GB Function-In-Memory DRAM, Based on HBM2 with a 1.2TFLOPS Programmable Computing Unit Using Bank-Level Parallelism, for Machine Learning Applications"; white paper; International Solid-State Circuits Conference; Demonstration Session-25; DRAM; 25.4; Feb. 18, 2021; San Francisco, CA, U.S.; 3 pages.

* cited by examiner

DATA ENCRYPTION SUITABLE FOR USE IN SYSTEMS WITH PROCESSING-IN-MEMORY

BACKGROUND

Many types of modern computing systems incorporate multiple processors and accelerators operating within a single address space. An important subclass of such systems are those with many loosely-coupled (i.e., not on the same die/chip) processors or accelerators. Examples include systems with multiple discrete graphics processing units (GPUs) and the emerging class of in-memory or near-memory processing devices. Due to the highly efficient access to the directly attached "local" memories, application programs written for these systems will mostly operate out of that local memory with only infrequent accesses to other memories in the system.

At the same time, data security has grown in importance because of bad actors or "hackers" who use increasingly sophisticated techniques to intercept and exploit valuable user data. While end-to-end encryption has helped prevent bad actors from intercepting and exploiting data sent over public networks, individual systems are still susceptible to data hacking by reading values stored in local memory chips. However, with the increasing use of accelerators and so-called "processors-in-memory" (PIMs), it has been difficult to protect data stored in a memory system. Moreover, a PIM would require a significant increase in circuit area to implement memory encryption using known techniques because the PIM sustains a much higher bandwidth than a non-PIM processor, necessitating a correspondingly higher throughput encryption implementation.

Figure 1:
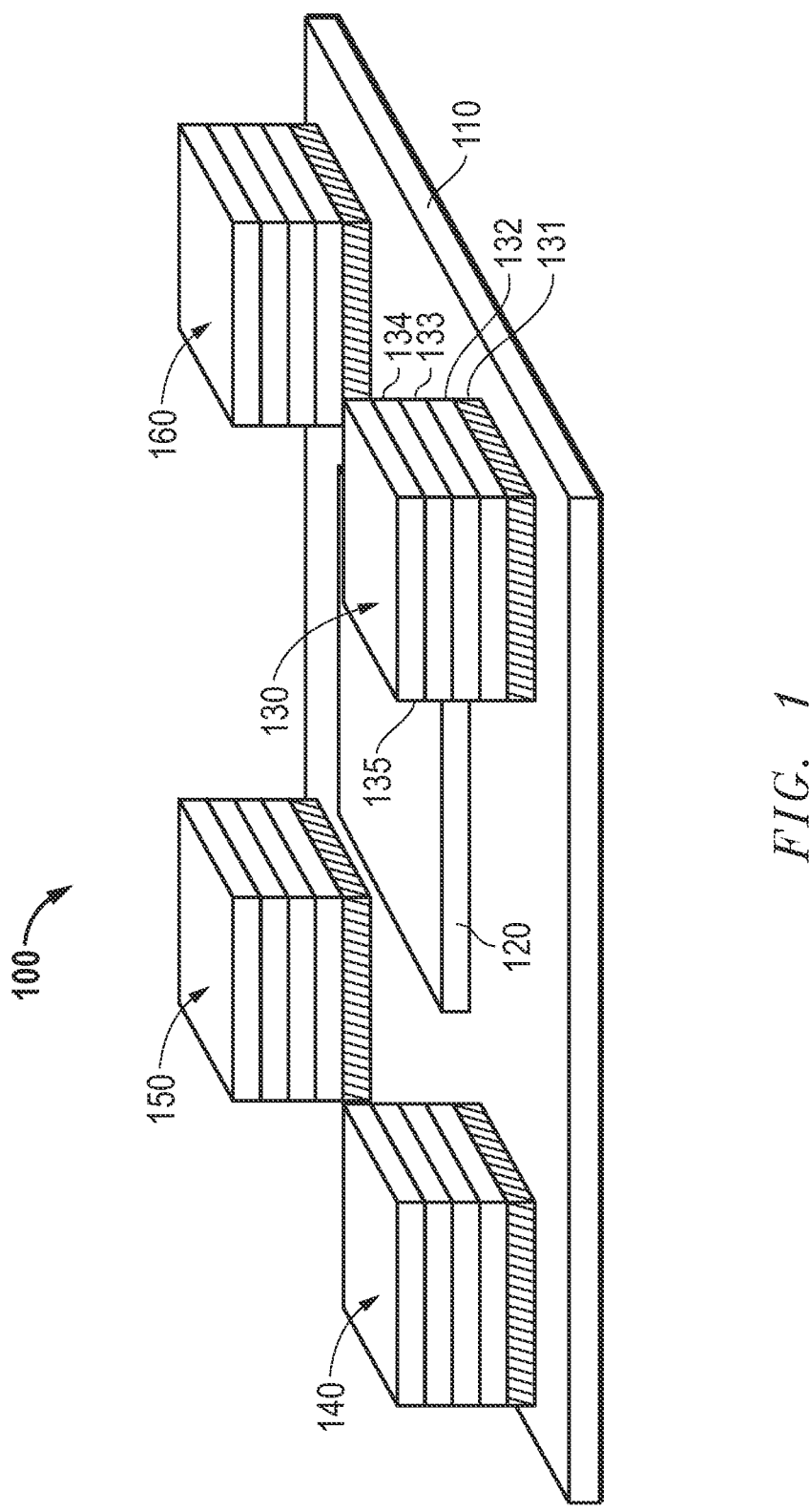
FIG. 1 illustrates a perspective view of a data processing system having a set of memory stacks each with a processor-in-memory according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An encryption circuit includes an iterative block cipher circuit. The iterative block cipher circuit has a counter input for a row index, a key input for receiving a secret key, and an output for providing an encrypted counter value in response to performing a block cipher process using the row index as a counter and the secret key. The encryption circuit uses the iterative block cipher circuit during a row operation to a memory.

A data processing system includes a host processor, a memory coupled to the host processor, and a processor-in-memory coupled to the memory. Each of the host processor and the processor-in-memory includes an encryption/decryption circuit having an iterative block cipher circuit. The iterative block cipher circuit has a counter input for a row index, a key input for receiving a secret key, and an output for providing an encrypted counter value in response to performing a block cipher process using the row index as a counter and the secret key. The encryption/decryption circuit uses the iterative block cipher circuit during a row operation to a memory.

A method for securely storing data in a memory includes generating a memory access request. If a memory row of the memory access request is not open, the memory row in the memory is opened, and an encrypted value is generated based on an index of the memory row and a secret key. Thereafter, data of the memory access request is encrypted using the encrypted value if the memory access request is a write command, and data of the memory access request is decrypted using the encrypted value if the memory access request is a read command.

FIG. 1 illustrates a perspective view of a data processing system 100 having a set of memory modules each with a processor-in-memory according to some embodiments. In the example shown in FIG. 1, data processing system 100 includes a host processor 120 and memory modules 130, 140, 150, and 160 each including a processor operating as a processor-in-memory (PIM) with a set of four vertically stacked memory die, all mounted on a printed circuit board or interconnect substrate 110. For example, memory module 130 includes a PIM 131 and memory dies 132, 133, 134, and 135. In one exemplary embodiment, memory modules 130, 140, 150, and 160 use high bandwidth memory (HBM) that is well adapted for vertical stacking through its use of through-silicon-via (TSV) technology, allowing data processing system 100 to occupy a relatively small amount of planar area and a relatively small amount of volume. In other embodiments, the PIM could be integrated with the memory on the same chip.

In one exemplary embodiment, data processing system 100 includes general-purpose graphics processing units as PIMs and host processor 120 handles I/O communication as well as task orchestration among the PIMs. Each PIM uses its local memory primarily for its own specific tasks. It should be apparent that the graphics processing unit example is only one example and that many others are possible. In other exemplary embodiments, a PIM may be tightly integrated with each individual memory bank within a larger memory module that itself includes tens or hundreds of memory banks. In these cases, the PIM can be much simpler than a general-purpose GPU, for example having just an arithmetic logic unit and a register file.

In the embodiment shown in FIG. 1, each processor has a four-die memory stack associated with it. The memory which is closely associated with a processor is deemed to be "local memory" to the processor. All other memory present in data processing system 100 which the processor can access but that is not local memory is known as "remote memory". All the memory shown in FIG. 1 is associated with a PIM. However, in other embodiments, the data processing system may have memory attached to host processor 120 without an associated in-memory processor, in which case this memory would be considered to be remote memory to every PIM in the system.

As will be explained further below, data in each memory stack is stored in memory dies in encrypted form. When the host processor writes the data to memory, it encrypts it and when it reads data from memory, it decrypts it using the encryption and decryption scheme described below. By not storing data in a memory chip or communicating data on an inter-chip bus in non-encrypted (also known as plaintext) form, data processing system 100 remains secure. Data is encrypted and decrypted when stored in and read from memory, respectively, using both a shared secret key and characteristics of the memory itself, making surreptitious interception and exploitation extremely difficult.

Figure 2:
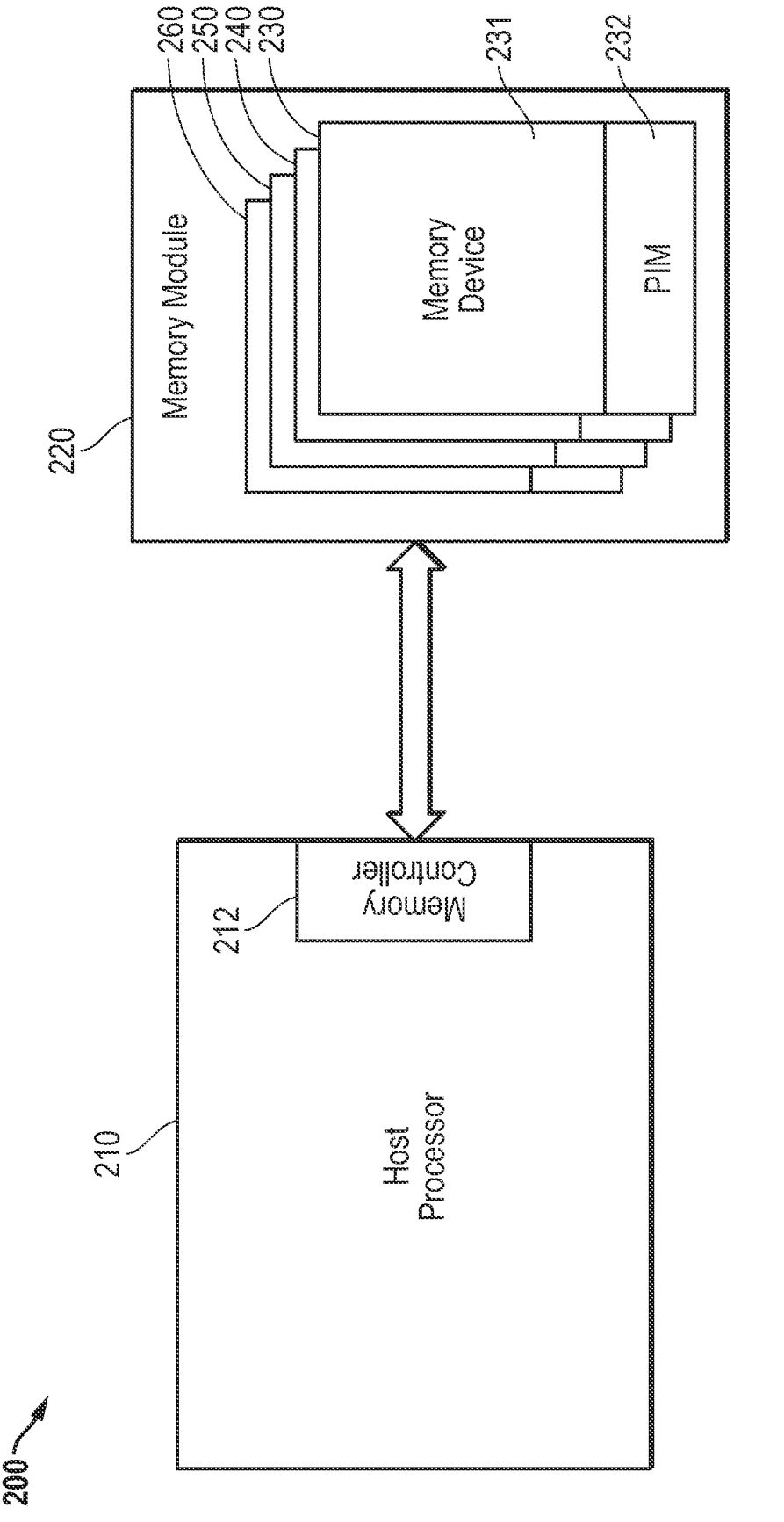
FIG. 2 illustrates in block diagram form a data processing system having a set of memories each with a processor-in-memory according to some embodiments.

FIG. 2 illustrates in block diagram form a data processing system 200 with a memory module 220 having a set of memories 230, 240, 250, and 260 each with a processor-in-memory according to some embodiments. Unlike the physical properties of data processing system 100 of FIG. 1, data processing system 200 describes the electrical properties. As shown, host processor 210 includes a memory controller 212 having an integral memory physical interface circuit (PHY) that communicates over a bus with memory module 220. In the illustrated embodiment, each of memories 230, 240, 250, and 260 includes a portion of the memory in memory module 220 and has a memory device such as memory device 231 in memory 230 and a processor-in-memory such as PIM 232 connected to memory device 231. In one embodiment, memory device 231 may be a memory bank. In other embodiments, the memory device 231 corresponds to all of the memory associated with a memory channel. Both host processor 210 and PIM 232 are capable of performing read and write accesses to memory device 231.

Figure 3:
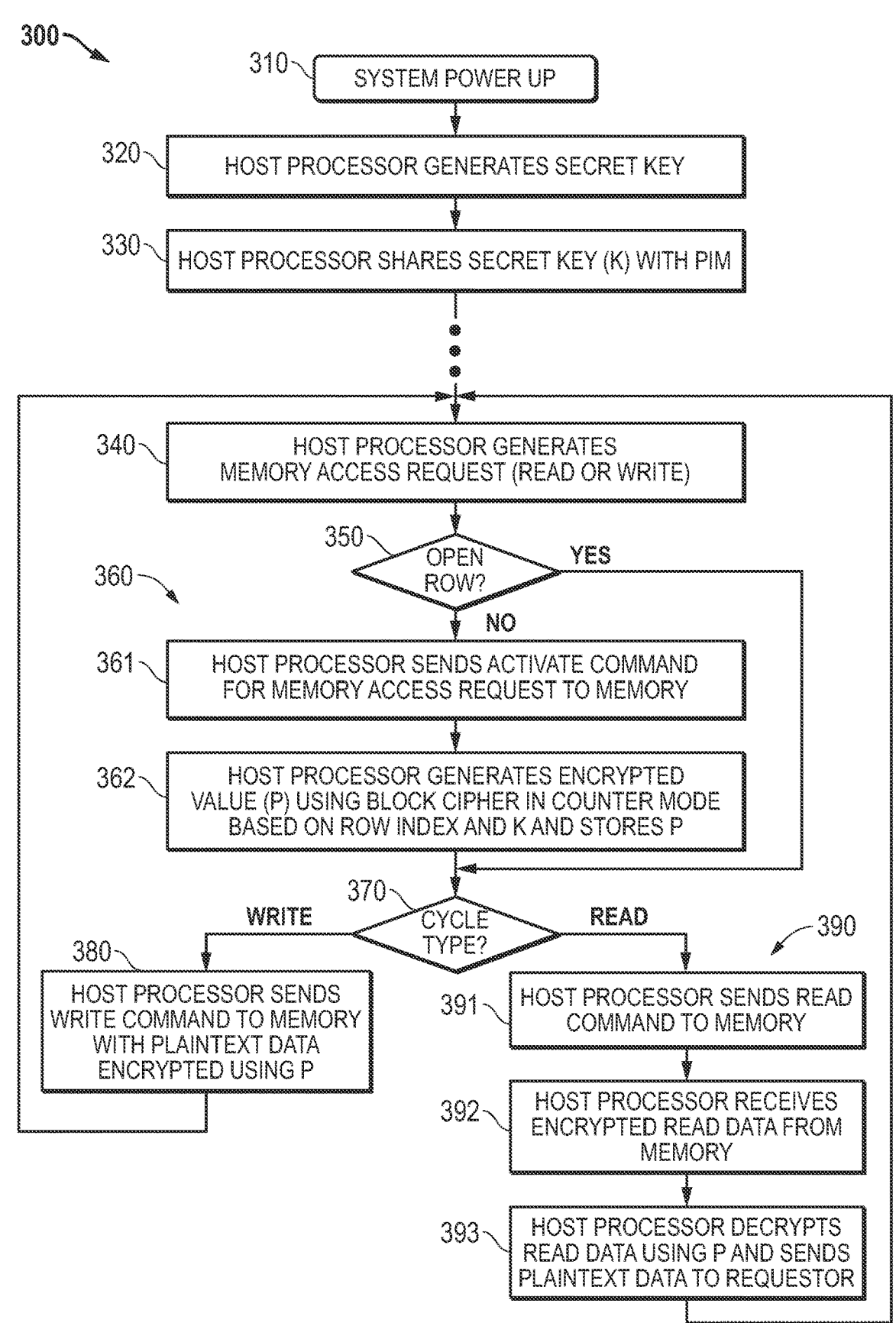
FIG. 3 illustrates a flow chart of a process used by a host processor for encrypting and decrypting data according to some embodiments.

FIG. 3 illustrates a flow chart of a process 300 used by a host processor for encrypting and decrypting data according to some embodiments. Process 300 starts at system power up, as shown in a box 310. In an action box 320, the host processor generates a secret key. The host processor can generate the secret key K by any suitable method, such as by a pseudo random-number generator or by measurement of a physical quantity that varies in a random manner. In an action box 330, the host processor shares the secret key K with the PIM. Each of the processor and the PIM can maintain the secret key in a manner that prevents easy hacking or reverse engineering, such as in a register that is not directly readable by software and may be laid out in a physically obscure location on the chip. In cases where the number of keys to be maintained in the memory module is fixed and small (e.g., one key in a baseline implementation), the secret key may be maintained in a write-only register or other such register storage that is not susceptible to deep-freeze, cold-boot, row-hammer and other such attacks. In cases where the number of secret keys is large (e.g., per-process keys) and they need to be stored in DRAM that is susceptible to the above attacks (e.g., cold boot or row hammer), security may be further improved by sending a key fragment from the host processor on every memory access and PIM command, which is then mixed with the key stored in memory to form the actual key used for block cipher encryption/decryption. In an action box 340, the host processor generates a memory access request, i.e., a read or write cycle.

Next, the memory controller determines whether the read or write request is to an open row in a decision box 350. This determination is performed, for example, by looking at a table that stores an index of the open rows in each memory bank. If the row is not open, then flow proceeds to a sub-flow 360. In sub-flow 360, in an action box 361, the host processor sends an activate command for the associated row to the corresponding bank of the memory. Prior to sending the activate command, the memory controller may need to close and precharge the row that is currently open. Moreover, the memory controller may hold the memory access request until it can be re-ordered for efficiency according to a set of scheduling criteria. These criteria are well-known and will not be described further. In an action box 362, the host processor generates an encrypted counter value P. In this exemplary implementation, the type of encryption is known as block cipher in counter mode based on the row index and the shared secret key K. In other embodiments, other types of encryption can be used. The host processor also internally stores P. For example, it can store P in the same table that stores the row number of the open row in each bank referred to above so it will be available for encryption and decryption operations while the row remains open. Since the block cipher in counter mode is an iterative cipher, it can be advantageously performed during the row activation time, and therefore the overhead of executing the block cipher in counter mode can be effectively hidden within this overhead period. Moreover, by allowing the block cipher computation to consume the full duration of the long-latency row activation operation, its implementation in hardware can be realized in a non-pipelined and/or iterative manner in this encryption technique, enabling the block cipher to be implemented with only a relatively small amount of circuitry.

At the end of sub-flow 360, flow proceeds to a decision box 370. If in decision box 350 the row is determined to be open, flow proceeds directly to decision box 370.

Decision box 370 determines whether the cycle is a read cycle or a write cycle. If the cycle is a write cycle, then flow proceeds to an action box 380. In action box 380, the host processor sends the write command to memory with the plaintext data encrypted using the encrypted counter value P. As will be explained below, encrypted counter value P has the same width as the data element (or portion of the data element sent in each cycle of a burst) and is used to quickly encrypt the data so the host processor will not add any observable overhead to the write cycle. A logic operation suitable for that will be further described below. At the end of the write cycle, flow returns to action box 340 in which process 300 waits for a subsequent memory access request.

If the cycle is a read cycle, then flow proceeds to a sub-flow 390, which includes action boxes 391, 392, and 393. In action box 391, the host processor sends the read command to memory. In action box 392, the host processor receives the requested data element from memory. As noted above, data is stored in memory in encrypted format, and in action box 393 the host processor decrypts the read data using the encrypted counter value P and sends the decrypted data, i.e., the data in plaintext form, to the requestor inside the host processor. Since encrypted counter value P has the same width as the data element (or portion of the data element sent in each cycle of a burst), it can likewise be used to quickly decrypt the data so the host processor will not add any observable overhead to the read cycle. At the end of the decryption operation, flow returns to action box 340 in which process 300 waits for a subsequent memory access request.

Thus, the host processor separates the encryption and decryption processes into two phases. First, during a row activation, the host processor generates encrypted counter value P using the shared secret key K to perform in iterative block cipher in counter mode. Then, during a read or write operation, the host processor encrypts (during a write operation) or decrypts (during a read operation) the data quickly using the encrypted counter value P to avoid adding overhead to memory controller operations, and with only a small amount of added circuit area.

Figure 4:
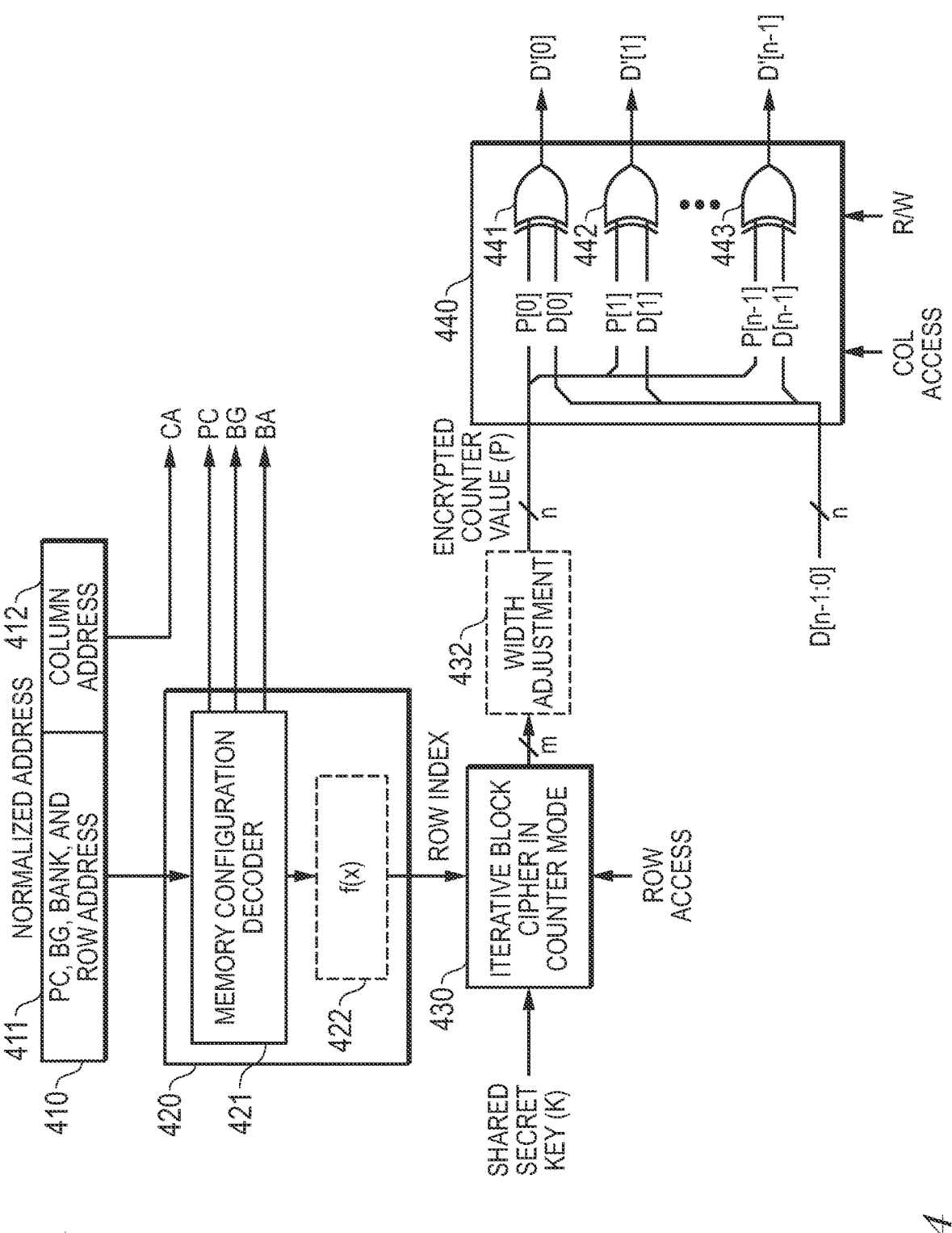
FIG. 4 illustrates in block diagram form an encryption circuit that can be used to implement the process of FIG. 3 according to some embodiments.

FIG. 4 illustrates in block diagram form an encryption circuit 400 that can be used to implement the process of FIG. 3 according to some embodiments. Encryption circuit 400 includes generally an address decoder 420 for receiving a memory address 410, an iterative block cipher circuit 430, and a data encryption/decryption circuit 440.

Memory address 410 is a physical memory address represented in normalized form, and includes a first field 411 for storing more-significant address bits that collectively identify a pseudo channel (PC), a bank group (BG), a bank, and a row of the memory system, and a second field 412 for storing less-significant address bits that collectively identify a column address. In various memory decoding schemes, the addresses can be remapped or hashed to reduce the chance that access patterns to consecutive addresses in a memory space will access different rows in the same bank, and the present disclosure encompasses both these decoding schemes and purely hierarchical decoding schemes.

Address decoder 420 includes a memory configuration decoder 421 and an optional deterministic function circuit 422 labelled "f(x)". Memory configuration decoder 421 is a circuit that is responsive to configuration information, generally determined at system startup, that identifies the type, size, and configuration of the memory system. This information is sufficient to allow memory configuration decoder 421 to decode a pseudo-channel PC, a bank group BG, a bank address BA, and a row index labelled "ROW INDEX". In some embodiments, memory configuration decoder 421 provides the ROW INDEX by stripping off the bits that indicate the column address, bank, bank group, and pseudo-channel so that the ROW INDEX has a value from 0 to n−1 when each memory bank has n rows. In other embodiments, address decoder 420 uses optional deterministic function circuit 422 to apply a mathematical transformation f(x) to alter the bits that make up the ROW INDEX, but will still have a value from 0 to n−1.

Iterative block cipher circuit 430 has a first input for receiving the ROW INDEX as a counter value, a second input for the receiving the shared secret key K, a third input for receiving a control signal labelled "ROW ACCESS", and an output for providing an m-bit value. In some embodiments, the m-bit value has the same width n as the data element and is provided directly as the encrypted counter value P. In other embodiments, the m-bit value has a smaller width than n, in which case an optional width adjustment circuit extends the width in a deterministic fashion to the full width n of the data element and provided as the encrypted counter value P.

Data encryption/decryption circuit 440 has an input for receiving the n-bit encrypted counter value P, an input for receiving the n-bit data value labelled "D[n−1:0]", a first control input for receiving a control signal labelled "COL ACCESS", a second control input for receiving a control signal labelled "R/W", and outputs for providing a modified n-bit data value D'[n−1:0]. Data encryption/decryption circuit 440 includes a set of exclusive-OR (XOR) gates including exemplary XOR gates 441, 442, and 443. XOR gate 441 has a first input for receiving a least-significant bit P[0] of encrypted counter value P, a second input for receiving a least-significant data bit D[0], and an output for providing a modified least-significant data bit D'[0]. XOR gate 442 has a first input for receiving a second least-significant bit P[1] of encrypted counter value P, a second input for receiving a second least-significant data bit D[1], and an output for providing a modified second least-significant bit D'[1]. This pattern is repeated until an XOR gate 443 has a first input for receiving a most-significant bit P[n−1] of encrypted counter value P, a second input for receiving a most-significant data value D[n−1], and an output for providing a modified least-significant bit D'[n−1].

Data encryption/decryption circuit 440 is responsive to the R/W control signal to use the plaintext write data as D[n−1:0] and provide the encrypted write data D'[n−1:0] when R/W indicates a write cycle, and to use the encrypted read data as D[n−1,0] and provide the plaintext read data as D'[n−1,0] when R/W indicates a read cycle. Data encryption/decryption circuit 440 is active in response to the activation of the COL ADDRESS control signal to perform a bit-by-bit XOR operation. Encryption circuit 400 is able to use the long latency of a row access command to execute the iterative block cipher in counter mode with a small circuit but without stalling memory accesses, and perform the fast data encryption and decryption operations using a single logic gate per bit, e.g., an XOR gate, to transform plaintext data to encrypted data and vice versa.

In other embodiments, data encryption/decryption circuit 440 can implement other logic operations, such as exclusive-NOR, using the same compact circuit, or more complex operations using different encryption and decryption logic. However, since the iterative block cipher in counter mode is a robust encryption method, the combination of the two will remain robust.

Figure 5:
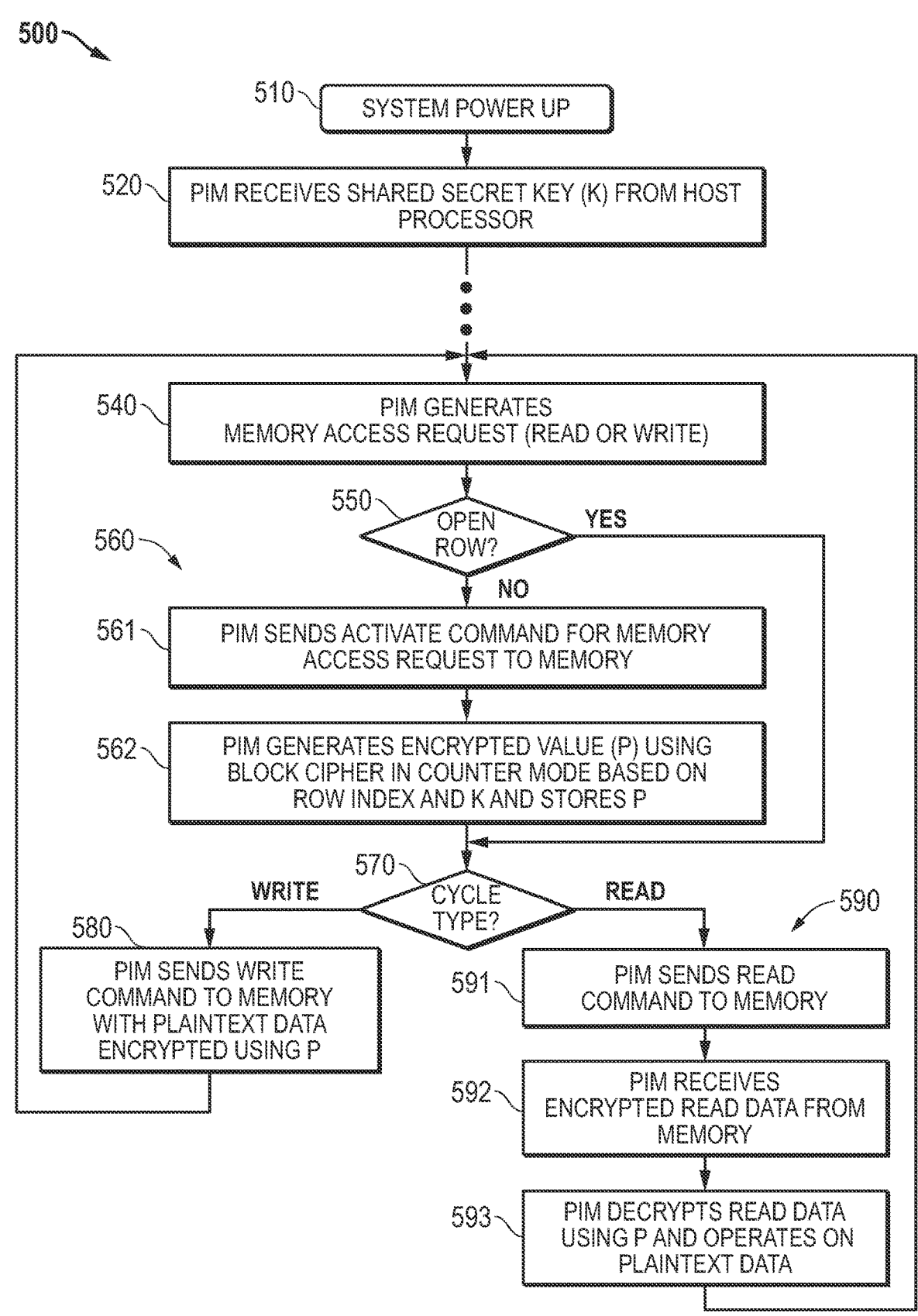
FIG. 5 illustrates a flow chart of a process used by a processor-in-memory for encrypting and decrypting data according to some embodiments.

FIG. 5 illustrates a flow chart of a process 500 used by a processor-in-memory for encrypting and decrypting data according to some embodiments. Process 500 starts at system power up, as shown in a box 510. In an action box 520, the PIM receives a secret key from the host processor. In an action box 540, the PIM generates a memory access request, i.e., a read or write cycle, by which it reads data from its associated memory or writes data to its associated memory.

The PIM determines whether the read or write request is to an open row in a decision box 550. This determination is performed, for example, by looking at a table that stores the row addresses of the open rows in each memory bank. If the accessed row is not open, then flow proceeds to a sub-flow 560. In sub-flow 560, in an action box 561, the PIM sends an activate command for the associated row to the corresponding bank of the memory. As is well-known, prior to sending the activate command, the PIM may need to close and precharge a different row that is currently open. Moreover, if the PIM uses its own memory controller, that memory controller may hold the memory access request until it can be re-ordered for efficiency according to a set of scheduling criteria. These criteria are well-known and will not be described further. In other embodiments, the host memory controller issues the row activation on behalf of the PIM. This division of operations is likely in cases in which the host sends fine-grain commands to the PIM to execute, and the host is aware exactly which row the PIM is going to need to have open. In these embodiments, the PIM will still generate the encrypted value P (using the row ID being activated by the host as counter input) during the host-issued row activation operation.

In an action box 562, the PIM generates an encrypted counter value P using block cipher in counter mode based on the row index and the shared secret key K. The PIM also stores P. For example, it can store P in the table that stores the row number of the open row in each bank referred to above so it will be available for encryption and decryption operations while the row remains open. Since the block cipher in counter mode is an iterative cipher, it can be advantageously performed during the row activation time, and therefore the overhead of executing the block cipher in counter mode can be effectively hidden within this overhead period. Moreover, while the block cipher in counter mode takes many clock cycles due to its iterative nature, it can be implemented with little additional circuit area, allowing the implementation of this encryption technique with a relatively small amount of added circuitry. At the end of sub-flow 560, flow proceeds to a decision box 570.

If in decision box 550 the row is determined to be open, flow proceeds directly to decision box 570.

Decision box 570 determines whether the cycle is a read cycle or a write cycle. If the cycle is a write cycle, then flow proceeds to an action box 580. In action box 580, the PIM sends the write command to memory with the plaintext data encrypted using the encrypted counter value P. As explained for the host processor, encrypted counter value P has the same width as the data element (or portion of the data element sent in each cycle of a burst) and is used to quickly encrypt the data on a bit-by-bit basis so the PIM will not add any observable overhead to the write cycle. A logic operation suitable for that was further described above. At the end of the write cycle, flow returns to action box 540 in which process 500 waits for a subsequent memory access request.

If the cycle is a read cycle, then flow proceeds to a sub-flow 590. Sub-flow 590 includes action boxes 591, 592, and 593. In action box 591, the PIM sends the read command to memory. In an action box 592, the PIM receives the requested data element from memory. As noted above, data is stored in memory in encrypted format, and in an action box 593 the PIM decrypts the read data using the encrypted counter value P and sends the decrypted data, i.e., the data in plaintext form, to the circuit or block inside the PIM that generated the request. Since encrypted counter value P has the same width as the data element (or portion of the data element sent in each cycle of a burst), it can likewise be used to quickly decrypt the data on a bit-by-bit basis so the PIM will not add any observable overhead to the read cycle. At the end of the decryption operation, flow returns to action box 540 in which process 300 waits for a subsequent memory access request.

Thus, the PIM, like the host processor, separates the encryption and decryption processing into two phases. First during a row activation phase, the PIM generates encrypted counter value P using the shared secret key K by performing an iterative block cipher in counter mode. Then during a column selection phase, i.e., a read or write operation, the PIM encrypts (during a write operation) or decrypts (during a read operation) the data quickly using the encrypted counter value P to avoid adding overhead to PIM operations, and with only a small amount of added circuit area.

Figure 6:
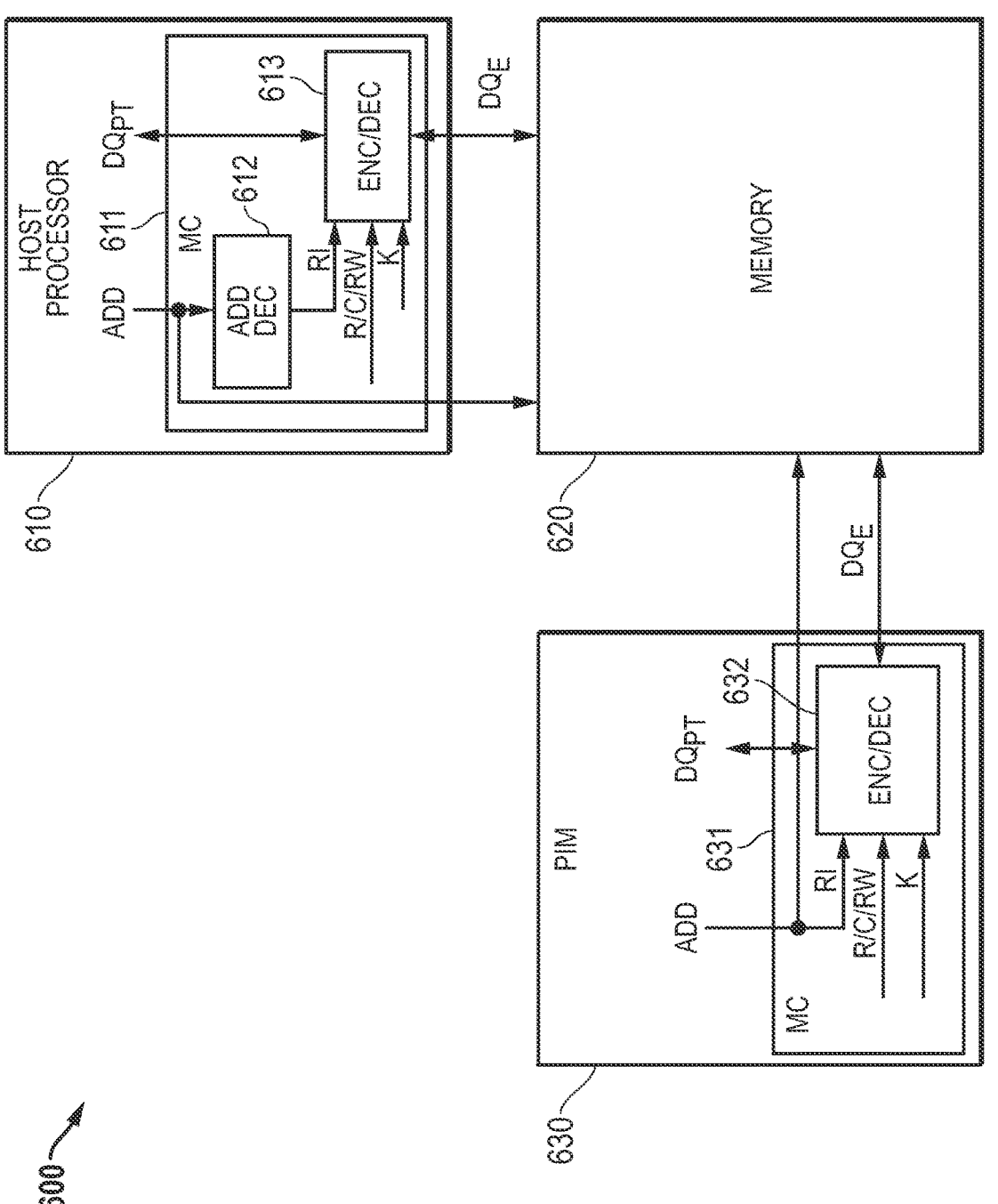
FIG. 6 illustrates in block diagram form a data processing system having a host processor and a processor-in-memory that perform encryption and decryption as described herein according to some embodiments.

FIG. 6 illustrates in block diagram form a data processing system 600 having a host processor 610 and a PIM 630 that perform encryption and decryption on data stored in or received from a memory 620 as described herein according to some embodiments. Host processor 610 includes a memory controller 611, and memory controller 611 includes an address decoder circuit 612 and an encoder/decoder circuit 613. Address decoder circuit 612 has an input for receiving an address labelled "ADD", and an output for providing a row index labelled "RI". Encoder/decoder circuit 613 has a bidirectional upstream port for transmitting plain text data labelled "$DQ_{PT}$", a downstream port for conducting encrypted data labelled "DQE", a first control input connected to the output of address decoder circuit 612 for receiving RI, a second input for receiving a set of control signals labelled "R/C/RW", and an input for receiving the shared secret key labelled "K".

PIM 630 is coupled to memory 620 and includes a memory controller 631 labelled "MC". Memory controller 631 in turn includes an encoder/decoder circuit 632.

Encoder/decoder circuit 632 has a bidirectional upstream port for conducting plain text data $DQ_{PT}$, a downstream port for conducting encrypted data DQE, a first control input receiving an address value ADD, the row index portion of which operates directly as the row index RI, a second input for receiving a set of control signals labelled "R/C/RW", and an input for receiving the shared secret key K. In some embodiments, the ADD used by memory controller 631 can originate in host processor 610 and be sent along with a command to memory 620. In other embodiments, PIM 630 can autonomously generate memory accesses, including row activations, by providing the ADD input to memory controller 631.

Moreover, some embodiments incorporate metadata per DRAM row, stored in memory 620, to further enhance security. In such embodiments, when accessing the DRAM row denoted by RI, the corresponding metadata is read from memory and is mixed with RI using a pre-defined function before being provided as the first control input to the encoder/decoder circuits 613 and 632. To improve performance, host processor 610 may implement a cache of metadata associated with recently or frequently accessed rows so that such metadata need not be repeatedly read from memory. Memory 620 may also implement such a cache in some embodiments to improve PIM performance. The metadata is incremented or otherwise deterministically modified by the accessor (i.e., host processor or PIM) every time the corresponding row is activated. Ensuring metadata consistency between host processor 610 and memory 620 is straightforward for PIM architectures in which all row activations are orchestrated by host memory controller 610. In this case, the host knows when to increment its copy of the metadata on row activations. For PIM architectures that can autonomously trigger row activations, however, any cached metadata values in the host processor's cache are invalidated and the new metadata values read from memory when accessing data that has been accessed by PIM.

As is evident from data processing system 600, memory 620 stores only encrypted data, whether it is generated by host processor 610 or PIM 630. Moreover, both host processor 610 and PIM 630 perform mathematical, logical, or control operations based on plaintext data $DQ_{PT}$, while maintaining the data in memory 620 only as encrypted data DQE. Thus, data processing system 600 provides enhanced data security by protecting data in memory 620, while performing encryption and decryption operations in a manner that hides the overhead while requiring only a small amount of additional circuitry.

The R/C/RW control signal indicates whether the memory access operation is a row or column operation, and whether the operation is a read or write operation. If the R/C/RW signal indicates a row operation, then processor 610 or PIM 630 provides an encrypted counter value in response to performing a block cipher process using the row index as a counter and the secret key. If the R/C/RW control signal indicates a read operation, then data encryption/decryption circuit 440 inputs the encrypted data read from the memory device as D[n−1:0] and performs a bitwise XOR operation using P to form plaintext data D'[n−1:0] for the use of either host processor 610 or PIM 630. If the R/C/RW control signal indicates a write operation, then data encryption/decryption circuit 440 inputs plaintext write data from host processor 610 or PIM 630 as D[n−1:0] and performs a bitwise XOR operation using P to form encrypted data D'[n−1:0] for storage in the accessed memory device.

A data processing system or portions thereof described herein can be embodied one or more integrated circuits, any of which may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the techniques described herein are particularly useful for a system with both a processor and a processor in memory, but could also be used to hide the overhead in other types of secure data processing systems that do not have a processor-in-memory. Moreover, the secret key described above can be generated by a variety of techniques, as well as being stored securely inside an integrated circuit chip in a variety of ways. In various embodiments, the row index can be formed either by directly decoding an input address, or by decoding the input address but then altering it according to a deterministic function. The length of the result of the iterative block cipher in counter mode also can either match the length of the data element, or its width can be adjusted to match the width of the data element. Moreover, the data element can be a whole unit of data captured during a burst cycle, or can be data transmitted on each individual cycle or "beat" of the burst cycle. Moreover, other logical functions can be used besides exclusive-OR, such as exclusive-NOR or more complex logical transforms, with the addition of some extra delay and some circuit area.

Accordingly, it is intended by the appended claims to cover all modifications of the disclosed embodiments that fall within the scope of the disclosed embodiments.

What is claimed is:

1. An encryption circuit, comprising:
an iterative block cipher circuit having a counter input for receiving a row index, a key input for receiving a secret key, and an output for providing an encrypted counter value in response to performing a block cipher process using said row index as a counter and said secret key; and
wherein the encryption circuit uses said iterative block cipher circuit to perform an iterative block cipher operation during a time period of a row activation operation to a memory in which an activate command with said row index is sent to said memory, wherein an overhead of said performing the iterative block cipher operation is hidden within said time period.

2. The encryption circuit of claim 1, wherein the encryption circuit further comprises:
a data encryption/decryption circuit responsive to said encrypted counter value for encrypting a data element of a memory access using said encrypted counter value, wherein the encryption circuit uses said data encryption/decryption circuit during a column operation to said memory.

3. The encryption circuit of claim 2, wherein said data encryption/decryption circuit comprises:
a plurality of exclusive-OR gates having first inputs for receiving a corresponding bit of said encrypted counter value, a second input for receiving a data value, and an output for providing a modified data value, wherein during an encryption operation, said data value is plaintext and said modified data value is encrypted, and during a decryption operation, said data value is encrypted and said modified data value is plaintext.

4. The encryption circuit of claim 1, further comprising:
an adjustment circuit for adjusting said encrypted counter value to another width according to a deterministic algorithm, wherein the other width is a width of data of a data access during a column access command.

5. The encryption circuit of claim 1, wherein said iterative block cipher circuit uses said secret key and a key fragment provided by one of a host processor and an associated processor-in-memory to generate a second key, and uses said second key to perform said block cipher process.

6. A data processing system comprising:
a host processor;
a memory coupled to said host processor;
a processor-in-memory coupled to said memory,
wherein each of said host processor and said processor-in-memory comprises an encryption circuit comprising:
an iterative block cipher circuit having a counter input for receiving a row index, a key input for receiving a secret key, and an output for providing an encrypted counter value in response to performing a block cipher process using said row index as a counter and said secret key; and
wherein said encryption circuit uses said iterative block cipher circuit to perform an iterative block cipher operation during a time period of a row activation operation to said memory in which said host processor sends an activate command with said row index to said memory, wherein an overhead of said performing the iterative block cipher operation is hidden within said time period.

7. The data processing system of claim 6, wherein the encryption circuit further comprises:
a data encryption/decryption circuit responsive to said encrypted counter value for encrypting a data element of a memory access using said encrypted counter value, wherein the encryption circuit uses said data encryption/decryption circuit during a column operation to said memory.

8. The data processing system of claim 7, wherein said data encryption/decryption circuit comprises:
a plurality of exclusive-OR gates having first inputs for receiving a corresponding bit of said encrypted counter value, a second input for receiving a data value, and an output for providing a modified data value, wherein during an encryption operation, said data value is plaintext and said modified data value is encrypted, and during a decryption operation, said data value is encrypted and said modified data value is plaintext.

9. The data processing system of claim 6, further comprising:

an adjustment circuit for adjusting said encrypted counter value to another width according to a deterministic algorithm, wherein the other width is a width of data of a data access during a column access command.

10. The data processing system of claim 6, wherein said encryption circuit is part of the host processor and the host processor further comprises:

an address decoder circuit having an input for receiving an address of a memory access, and an output for providing said row index, said address decoder circuit generating said row index from a row address portion of said address of said memory access using configuration information.

11. The data processing system of claim 10, wherein said address decoder circuit comprises:

a memory configuration decoder having an input for receiving said address of said memory access, and an output for providing a preliminary row index; and a deterministic function circuit having an input coupled to said output of said memory configuration decoder, and an output for providing said row index.

12. The data processing system of claim 6, wherein said iterative block cipher circuit uses said secret key and a key fragment provided by one of said host processor and said processor-in-memory to generate a second key, and uses said second key to perform said block cipher process.

13. A method for securely storing data in a memory, comprising:

generating a memory access request;

responsive to determining that a memory row of said memory access request is not open:

opening said memory row in the memory during a row activation operation, wherein said opening comprises sending an activate command with a row index to the memory; and generating, during a time period of said row activation operation, an encrypted counter value based on using said row index of said memory row as a counter and a secret key, wherein an overhead of said generating the encrypted counter value is hidden within said time period;

thereafter:

encrypting data of said memory access request using said encrypted counter value responsive to determining that said memory access request is a write command; and decrypting data of said memory access request using said encrypted counter value responsive to determining that said memory access request is a read command.

14. The method of claim 13, wherein said generating said encrypted counter value comprises:

generating said encrypted counter value using an iterative algorithm performed over a plurality of clock cycles.

15. The method of claim 13, generating said encrypted counter value further comprises:

using an iterative block cipher in counter mode.

16. The method of claim 15, wherein said using said iterative block cipher in said counter mode comprises:

forming an initial counter value in response to said row index; and generating said encrypted counter value using said secret key in response to said forming.

17. The method of claim 16, wherein said forming comprises:

forming said initial counter value in response to said row index modified by a deterministic logic function.

18. The method of claim 13, wherein said encrypting said data comprises:

changing said data to encrypted data by performing a bit-by-bit exclusive-OR operation on bits of data with corresponding bits of said encrypted counter value.

19. The method of claim 13, wherein said generating said encrypted counter value comprises:

adjusting said encrypted counter value to another width according to a deterministic algorithm.

* * * * *